United States Patent [19]

Bond

[11] 4,344,609

[45] Aug. 17, 1982

[54] RESILIENT POSITIONING APPARATUS

[75] Inventor: Harold U. Bond, Vancouver, Canada

[73] Assignee: Kockums Industries Limited, Surrey, Canada

[21] Appl. No.: 142,612

[22] Filed: Apr. 21, 1980

[51] Int. Cl.³ .............................................. B23Q 3/08
[52] U.S. Cl. ........................................ 269/27; 83/726; 269/224; 92/85 B
[58] Field of Search ...................... 269/28, 224, 27, 32; 173/139, 162 H; 83/726; 92/8, 143, 85 R, 85 B, 85 A

[56] References Cited

U.S. PATENT DOCUMENTS

| | | |
|---|---|---|
| 1,724,314 | 8/1929 | Rober . |
| 2,353,293 | 7/1944 | Brooking . |
| 3,202,062 | 8/1965 | Burden ................................ 92/85 B |

FOREIGN PATENT DOCUMENTS 88303 11/1956 Norway ................................ 83/726

Primary Examiner—Robert C. Watson

Attorney, Agent, or Firm—Carver & Co.

[57] ABSTRACT

Resilient positioning apparatus for sustaining repeated shock loads from heavy work pieces, with ability to reposition work pieces accurately and quickly with negligible loss of accuracy after long service. Apparatus has telescoping assembly having two portions which can be accurately positioned relative to each other and a gas cylinder which has a partition cooperating with one of the portions. The partition defines a chamber with the portions of the telescoping assembly, and the chamber is exposed to pressurized gas which forces the partition, and with it the telescoping assembly against a datum. When the telescoping apparatus is subjected to shock load from a work piece, it is momentarily shifted off the datum, thus cushioning the telescoping assembly, and is then quickly returned due to force from the gas cylinder. The invention is simple and eliminates complex valving associated with shock absorbing hydraulic circuits and is not subjected to buckling under compression loads.

8 Claims, 3 Drawing Figures

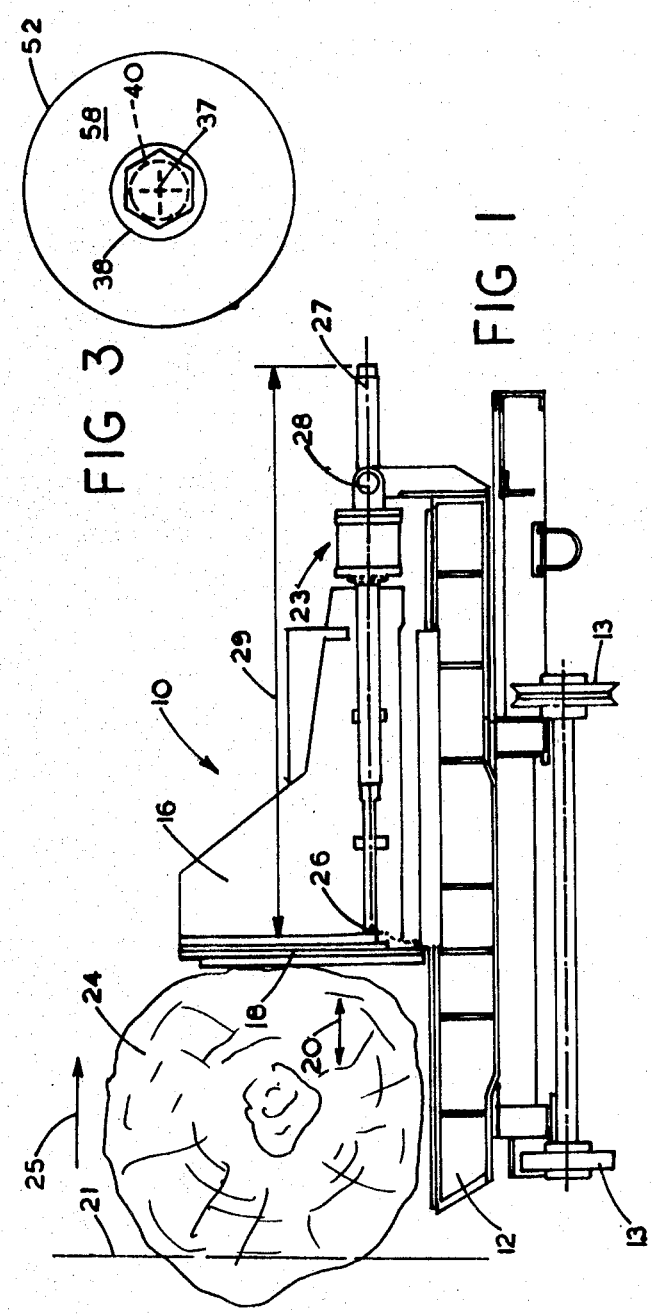

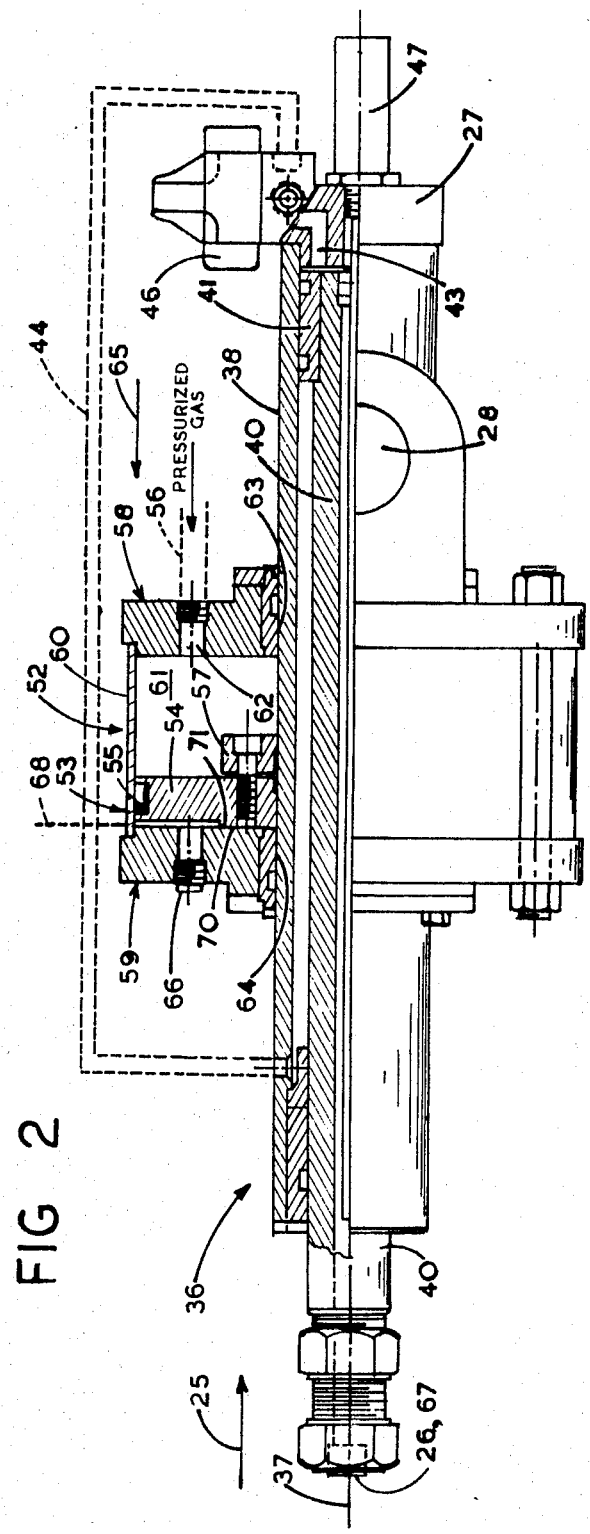

RESILIENT POSITIONING APPARATUS

BACKGROUND OF THE INVENTION

1. Field of the Invention

The invention relates to a resilient positioning apparatus, that is an extensible and retractable telescoping apparatus designed to position a work piece accurately, and yet be capable of withstanding shock loads from the work piece contacting the apparatus.

2. Prior Art

The present invention can be used in the sawmill industry, and is particularly adapted for positioning cylinders associated with log positioning knees of a log carriage. Positioning apparatus are commonly hydraulic cylinders and these have been used in diverse industrial applications. Sometimes the cylinders are subjected to shock from the work piece contacting structure associated with the cylinder and such shocks can damage, or at least lessen accuracy of, the positioning cylinder. This is particularly true of the positioning cylinders used in a sawmill log carriage. To the inventor's knowledge, there are two main possible approaches to protect the positioning cylinder from such shocks, and these are discussed briefly below.

The first approach might be to resiliently mount the cylinder, for example, by using a mechanical compression coil spring or other resilient device mounted in tandem with the cylinder, ie. at an end of the cylinder remote from the end experiencing the shocks. This can be termed a tandem, stacked or compound positioning device and might be adequate for light loads, but to provide sufficient travel for the cylinder to absorb typical shock loads from heavy logs, the spring must possess considerable resilient, and for a coil spring, this requires a considerable length. Thus an excessive amount of space would be required behind the positioning cylinder which is usually inconvenient or impossible on a sawmill carriage. Furthermore, the cylinder and tandem spring device would form an excessively long combination which might be subject to buckling under high compressive loads. In some compound or tandem spring combinations, permanent deformation or wear of the springs may produce slackness or lost motion, which reduces accuracy of re-location of the positioning cylinder. Thus accuracy would likely decrease with much use of the device. Also, excessive "working" of the spring under load could result in premature fatigue failure of the spring.

The second approach to protecting the cylinder from shock is to provide the hydraulic circuit which is used to position the components of the positioning cylinder with pressure limiting valves. These vales open automatically when fluid pressure exceeds a pre-determined amount due to excessive force on the positioning cylinder, and then close when pressure returns to normal, the hydraulic power supply then repositioning the components. Whilst such devices can be adequate in some applications, in sawmill carriages difficulties commonly arise. Each collapse and recovery of the apparatus requires operation of valves, a hydraulic power supply and various other components, which determine accuracy of repositioning, and thus wear accumulates after the apparatus has sustained many shocks. Also the hydraulic power supply is required to replace fluid to reposition the cylinder, thus incurring greater energy requirements. Thus shock absorbing circuits of this type tend to be relatively complex and are known to be troublesome for servicing, due to rapid wear of initial valves, etc. resulting in a gradual loss of accuracy. Also, response of the hydraulic circuit can be such that the cylinder is repositioned relatively slowly after displacement due to the shock.

SUMMARY OF THE INVENTION

The invention reduces difficulties and disadvantages of the prior art by providing a telescoping positioning apparatus which cooperates with a pneumatic cylinder to provide a resilient cushioning mounting. The pneumatic cushioning structure eliminates complications resulting from a shock absorbing hydraulic circuit or mechanical springs mounted in tandem with a positioning cylinder. The device is compact and does not require additional installation length from that length that would be required for a non-resiliently mounted positioning cylinder. Due to compactness, the apparatus usually can be fitted into existing installations without major re-design, or can be used in new structures of compact design. Its relative compactness essentially eliminates any buckling tendencies that might be prevalent with tandem spring arrangements. Furthermore, after collapsing due to a shock load, the apparatus recovers quickly and repositions itself accurately by using structure which, in itself, is not subjected to excessive wear resulting from the shock load. Thus, repeated collapsing of the apparatus does not aggravate wear and lessen accuracy because the portions of the apparatus that determine repositioning accuracy are protected by the resilient mounting. Also, the hydraulic power supply is not required to pump hydraulic fluid to the cylinder to replace that displaced after collapsing. The invention is also characterized by simplicity which lowers manufacturing and servicing costs.

A resilient positioning apparatus according to the invention is for a machine and is adapted to resiliently absorb force from an object moving thereagainst by moving momentarily relative to a machine datum, the machine having a machine stop means fixed relative to the machine datum. The apparatus includes a telescoping assembly and a gas cylinder assembly. The telescoping assembly has extendable and retractable first and second portions which cooperate with power and control means of the machine to position the two portions accurately relatively to each other. The first portion cooperates with the object to locate the object, and the second portion has an assembly stop means adapted to contact the machine stop means for registration of the second portion. The apparatus further includes a gas cylinder assembly having a partition means and a gas cylinder body. The partition means is secured to the second portion of the telescoping assembly so as to move therewith, and is in sealing engagement with the gas cylinder body. The gas cylinder body has first and second ends with sealing means adjacent at least the first end thereof. The gas cylinder body encloses a length of the second portion and cooperates with the partition means and the second portion so as to form at least one chamber defined in part by the gas cylinder body, the partition means and the second portion. The chamber is essentially sealed and is adapted to receive gas under pressure to generate a pneumatic force on the second portion to establish registration of the assembly stop means of the second portion against the machine stop means to register the telescoping assembly relative to the machine datum. The pneumatic force is overcome when the telescoping assembly is subjected to an excessive force which moves the second portion momentarily out of registration to absorb the excessive force, and thereafter, the pneumatic force re-establishes registration of the second portion to re-establish the data for the telescoping assembly.

A detailed disclosure following, related to drawings, describes a preferred embodiment of the invention, which is capable of expression in structure other than that particularly described and illustrated.

DESCRIPTION OF THE DRAWINGS

FIG. 1 is a simplified diagrammatic end elevation of a portion of a sawmill log carriage showing one application of the invention, FIG. 2 is a simplified, partially sectioned, side elevation of the invention, FIG. 3 is a simplified fragmented end elevation of the invention of FIG. 2.

DETAILED DISCLOSURE

FIG. 1

One particular application of the invention will be described, but clearly other applications are anticipated. A portion of a sawmill log carriage is designated 10 and has a carriage frame 12 mounted on at least four wheels 13, two only being shown, the wheels running on rails adjacent a saw, not shown. The frame carries at least two bunks, one only being shown and designated 16, which will be described briefly. The bunk 16 has a knee 18 which is movable according to a double-headed arrow 20 relative to a machine datum 21, which would normally represent a plane of cut of a saw, not shown. A resilient positioning apparatus 23 according to the invention cooperates with the knee 18 for movement as above and is thus movable laterally relative to the carriage.

The apparatus 23 has a front end 26 connected to the knee, and a rear end 27 spaced outwardly from the carriage. The apparatus is mounted on a trunnion mounting 28 carried on the carriage for swinging as required. The trunnion thus fixes a portion of the apparatus relative to the machine datum and equivalent securing means can be substituted.

A log 24 is normally rolled onto the sawmill carriage from an infed conveyor, not shown, in direction of an arrow 25 and, particularly with the larger logs rolling quickly, considerable shock force must be absorbed by the bunk when contacted by the log. Portions of the positioning apparatus 23 must be protected from this shock otherwise loss of accuracy will result and, as will be described, the portions of the apparatus of the invention are resiliently mounted using pressurized gas which does not increase overall length 29 of the positioning means. Furthermore, the apparatus has a rapid response to bring the positioning means back into register so as to permit accurate positioning of the log for sawing.

FIGS. 2 and 3

The positioning apparatus 23 has a telescoping assembly 36 having a central longitudinal axis 37, a hydraulic cylinder body 38 and a piston rod 40 carrying a piston 41 sealed for longitudinal movement relative to the cylinder body. Conduit means 43 and 44 communicate with ports at opposite ends of the cylinder body to admit hydraulic fluid into and exhaust fluid from the cylinder body. A three-position, closed center, four-way control valve 46 controls fluid flow through the conduits, the valve being controlled by known control means, not shown. It can be seen that access for fluid to a front face of the piston is through the conduit 43, and to a rear face of the piston is through the conduit 44, the latter conduit being shown schematically. Thus the conduit means cooperate with opposite ends of the hydraulic cylinder to communicate with both faces of the piston. A transducer 47 cooperates with the piston rod 40 and generates a position signal reflecting position of the piston rod relative to the cylinder body 38. This signal is fed to the control means as a feedback signal and, if necessary, valve 46 is re-actuated to position the rod 40 as desired. The transducer is thus a portion of a feedback means for accurately positioning the rod 40 relative to the body 38, and uses known circuitry and equivalent feedback means can be substituted. The transducer is a linear transducer with a suitable datum on the cylinder body 38, although rotary transducers and tensioned wire and pulley arrangements are also suitable.

The apparatus also includes a gas cylinder 52 having a gas cylinder body 53 and a gas cylinder piston 54 which is slidable within the body 53. The piston 54 has sliding seals 55 which sweep the body 53, and the piston is in sealing contact with and secured to the hydraulic cylinder body 38 by a retaining ring and screw means 57. The gas cylinder body includes first and second end caps 58 and 59, the caps having aligned openings 63 and 64 respectively therein to accept the hydraulic cylinder body. Thus the piston is movable with the hydraulic cylinder body between the end caps. The first end cap 58 in particular is sealed against gas leakage between the end cap 58 and the cylinder body 38. The body 53 also includes a hollow cylindrical wall portion 60 extending between and sealed to the end caps, and disposed concentrically with the body 38. The end cap 58 has a gas port 62 connected via gas conduit means 56 to a pressurized gas supply, not shown. The gas port 62 admits the pressurized gas into an annular chamber 61 defined in part by a portion of the hydraulic cylinder body 38, the gas cylinder piston 54, the cylindrical wall portion 60 and the end cap 58. The gas supply can be a sealed gas reservoir having a volume many times larger than displacement of the piston 54, thus providing an essentially constant pressure when the piston is displaced. Alternatively, the gas supply may have a relatively small reservoir volume, thus providing an increasing pressure as the piston 54 is displaced. A breather plug 66 of porous sintered steel is fitted in the end cap 59 to prevent excessive low or high pressure forming in a chamber on an opposite side of the piston 54. Thus, the gas cylinder body has first and second ends with sealing means adjacent at least the first end thereof. The gas cylinder body can be seen to have a central longitudinal axis that is coincident with the axis 37 of the telescoping assembly, and encloses a portion of the telescoping assembly 36.

The trunnion mounting 28 is fitted on the gas cylinder 52 and secures the apparatus 23 to the sawmill carriage, and thus locates the gas cylinder relative to the machine datum 21 (FIG. 1). It can be seen that the hydraulic cylinder body 38 is rigidly secured to the gas cylinder piston 54 and thus serves as a piston rod for the gas cylinder piston, and is free for limited axial sliding within the aligned openings 63 and 64 in the end caps 58 and 59. Movement of the hydraulic cylinder body relative to the gas cylinder in direction of an arrow 65 is limited by interference between an outer face 70 of the gas cylinder piston 54 and an inner face 71 of the end cap 59. Thus the face 70 serves as an assembly stop means on the second portion, and the face 71 of the end cap serves as a machine stop means which is fixed relative to the machine datum 21. The machine stop means is thus adapted to be contacted by the assembly stop means for registration of the body 38 relative to the gas cylinder at an end of travel of the body 38 when the chamber 61 is at its maximum volume. The machine stop means is a portion of the apparatus itself and establishes a body datum 68 which in this embodiment is coincident with the machine stop means. If the rod 40 were hydraulically locked in a particular position relative to the hydraulic cylinder body 38, and sufficient force were applied to the end 26 of the piston rod in direction of the arrow 25, the force generated by gas pressure on the telescoping assembly 36 would be overcome and the cylinder body 38 would shift in the direction of the arrow 25, causing the gas cylinder piston 54 to move away from the end cap 59.

The particular position of the piston rod 40 relative to the hydraulic cylinder body 38 is determined by position signals from the control means which in effect results in a relative positioning of respective data of the piston rod 40 and the body 38. For convenience, the location of the front end 26 of the piston rod 40 is designated as a rod datum or first datum 67 for the piston rod 40, and the outer face of the piston 54 is selected as the body or second datum 68 for the cylinder body 38.

Thus, in general terms, the telescoping assembly has extendable and retractable first and second portions, namely the piston rod 40 and the cylinder body 38, which cooperate with power and control means to position the two portions accurately relative to each other. In effect, the first and second portions have first and second data respectively, and the apparatus is adapted to reposition the data relative to the machine datum after absorbing force from an object which shifts the first and second data relative to the machine datum.

It can be seen that the gas cylinder 52 is disposed between opposite ends of the telescoping assembly and thus does not increase overall length 29 (FIG. 1) of the telescoping assembly. The resilient positioning apparatus 23 can, therefore, be used in locations where longer devices would be unsuitable. This is particularly useful where a resilient positioning cylinder according to the invention is to be fitted in an existing piece of equipment where there would be insufficient space to fit a prior art positioning cylinder with a tandem spring mount. Also, as there is no increase in length of the device, any tendency of the positioning cylinder to buckle under compression is not increased.

OPERATION

Operation of the apparatus 23 follows that of non-resilient prior art apparatus except that, when the apparatus is subjected to a shock loading on the front end 26 of the piston rod, recovery of the apparatus to an accurate reference location following the initial displacement of the telescoping assembly can be of a shorter time than some prior art resiliently mounted apparatus.

The signal from the control means is fed through the control valve 46 to attain the desired position of the piston rod 40 relative to the hydraulic cylinder 38. Initially, the chamber 61 is pressurized with gas to provide sufficient force on the telescoping assembly to resist normal static loads on the telescoping assembly, and yet permit movement of the telescoping assembly under higher, short duration dynamic loads.

Thus the chamber 61 is essentially sealed and receives gas under pressure to generate a pneumatic force to establish registration of the gas cylinder so as to register the data of the telescoping assembly. The pneumatic force is overcome when the telescoping assembly is subjected to an excessive force which moves the gas cylinder momentarily out of registration to absorb the excessive force. Thereafter, the pneumatic force re-establishes registration of the second portion to re-establish the data for the telescoping assembly.

ALTERNATIVES AND EQUIVALENTS

The telescoping assembly 36 as described is shown to be a hydraulic jack and clearly, an alternative telescoping assembly can be substituted. For example, a precision lead screw could be substituted but this is not preferred because it has a relatively slow response to setting signals and is relatively costly to produce and maintain.

The gas cylinder body 53 houses the rigid gas cylinder piston 54 which is secured to and encloses a portion of the hydraulic cylinder body 53. The piston 54 therefore serves as an axially movable partition to provide a surface upon which the pressurized gas acts to resiliently mount the telescoping assembly. The piston 54 is effectively a partition means which is a rigid annular piston secured to and enclosing the hydraulic cylinder body. The piston 54 contacts the end cap 59 and thus the end cap 59 and the piston 54 also serve as the machine and assembly stop means for registration of the cylinder body 38. Alternative machine stop means and assembly stop means can be substituted and can be remote from the air cylinder if preferred.

Equivalent partition means can be substituted for the rigid piston with the sliding seal, for example, a rolling diaphragm or bellows type of air spring can be directly substituted for the piston 54. Whilst there might be some problems relating to life of the diaphragm, a diaphragm type of air spring has advantages of less frictional resistance and leakage losses than with a conventional sliding seal piston. The diaphragm has an inner portion secured to the hydraulic cylinder body 38, and an outer portion secured to the gas cylinder body 53. Also, alternative stop means might be required to ensure positive registration of the gas cylinder, and these could be remote from the air cylinder also.

In summary, all equivalent apparatus have a partition means cooperating with the gas cylinder body and secured to the second portion of the telescoping assembly so as to move therewith for sealing engagement with the gas cylinder body. In all embodiments, an assembly stop means is provided on the second portion of the telescoping assembly, and a machine stop means is provided and is fixed relative to the machine datum and is controlled by the assembly stop means for registration of the second portion.

It can be seen that repeated heavy use of this apparatus would likely increase the chances of gas leakage from the gas cylinder through working of the sliding seals, or diaphragm if used, but these items are not costly or difficult to replace. Clearly, the servicing costs of this invention will be considerably less than those associated with shock absorbing hydraulic circuits.

I claim:

1. A resilient positioning apparatus for a machine adapted to resiliently absorb force from an object moving thereagainst by moving momentarily relative to a machine datum, the machine having a machine stop means fixed relative to the machine datum, the apparatus including:
- (a) a telescoping assembly having extendable and retractable first and second portions which cooperate with power and control means of the machine to position the two portions accurately relative to each other, the first portion cooperating with the object to locate the object, the second portion having an assembly stop means adapted to contact the machine stop means for registration of the second portion,
- (b) a gas cylinder assembly having a partition means and a gas cylinder body, the partition means being secured to the second portion of the telescoping assembly so as to move therewith, and being in sealing engagement with the gas cylinder body, the gas cylinder body having first and second ends with sealing means adjacent at least the first end thereof, the gas cylinder body enclosing a length of the second portion and cooperating with the partition means and the second portion so as to form at least one chamber defined in part by the gas cylinder body, the partition means and the second portion; the chamber being essentially sealed and adapted to receive gas under pressure to generate a pneumatic force on the second portion to establish registration of the assembly stop means of the second portion against the machine stop means so as to register the telescoping assembly relative to the machine datum, the pneumatic force being overcome when the telescoping assembly is subjected to an excessive force which moves the second portion out of registration to absorb the excessive force, and thereafter the pneumatic force re-establishes registration of the second portion to reposition the telescoping assembly.

2. A resilient positioning apparatus as claimed in claim 1 further characterized by:
- (a) the telescoping assembly having a central longitudinal axis,
- (b) the gas cylinder assembly having a central longitudinal axis coincident with the axis of the telescoping assembly.

3. A resilient positioning apparatus as claimed in claim 2 further characterized by:
- (a) the gas cylinder is disposed between opposite ends of the telescoping assembly so as to affect immaterially overall length of the telescoping assembly.

4. A resilient positioning apparatus as claimed in claim 1 further characterized by:
- (a) the telescoping assembly having a hydraulic positioning cylinder having a hydraulic cylinder body with a piston rod and piston sealed for longitudinal movement relative to the cylinder body, with conduit means to admit fluid into and exhaust fluid from the hydraulic cylinder body.

5. A resilient positioning apparatus as claimed in claim 4 further characterized by:
- (a) the first portion of the telescoping assembly is the piston rod and associated piston,
- (b) the second portion of the telescoping assembly is the hydraulic cylinder body.

6. A resilient positioning apparatus as claimed in claim 5 further characterized by:
- (a) the partition means being an annular piston secured to and enclosing the hydraulic cylinder body,
- (b) the gas cylinder body having a cylindrical wall portion and first and second end caps secured adjacent opposite ends of the wall portion, the second end cap being adjacent an outer end of the piston rod of the hydraulic cylinder, the end caps enclosing the hydraulic cylinder body and the first end cap being sealed against gas leakage between the first end cap and the hydraulic cylinder body, the partition means being movable with the hydraulic cylinder body between the end caps,
- (c) conduit means to admit pressurized gas to the chamber defined in part by the partition means, a portion of the gas cylinder body portion and the first end cap so as to force the partition towards the second end cap.

7. A resilient positioning apparatus as claimed in claim 6 further characterized by:
- (a) the second end cap serving as the machine stop means, and the partition means serving as the assembly stop means, the second end cap being positioned to be contacted by the partition means to register the second portion relative to the machine datum.

8. A resilient positioning apparatus as claimed in claim 4 further characterized by:
- (a) the conduit means to admit fluid into and exhaust fluid from the hydraulic cylinder body cooperate with opposite ends of the hydraulic cylinder body to communicate with fluid on both faces of the piston.

* * * * *